United States Patent [19]

Kawabata et al.

[11] Patent Number: 4,474,447
[45] Date of Patent: Oct. 2, 1984

[54] CAMERA WITH AUTOMATIC FOCUSING DEVICE

[75] Inventors: Takashi Kawabata; Masaharu Kawamura, both of Kanagawa; Hiroyasu Murakami, Tokyo, all of Japan

[73] Assignee: Canon Kabushiki Kaisha, Tokyo, Japan

[21] Appl. No.: 439,786

[22] Filed: Nov. 8, 1982

[30] Foreign Application Priority Data

Nov. 20, 1981 [JP] Japan ................................. 56-187307

[51] Int. Cl.³ .......................... G03B 7/26; G03B 13/18
[52] U.S. Cl. ..................................... 354/406; 354/409; 354/484
[58] Field of Search ................. 354/25 R, 25 A, 25 P, 354/25 N, 195, 266, 60 R, 400–409, 484; 352/140, 141

[56] References Cited

U.S. PATENT DOCUMENTS

| | | | |
|---|---|---|---|
| 3,435,744 | 4/1969 | Stimson | 354/25 A |
| 3,554,633 | 1/1971 | Sekine | 352/141 |
| 3,599,552 | 8/1971 | Harvey | 354/25 A |
| 3,691,922 | 9/1972 | Konig et al. | 354/25 |
| 3,720,148 | 3/1973 | Harvey | 354/25 A |
| 3,798,660 | 3/1974 | Hasegawa et al. | 354/25 N |
| 3,818,494 | 6/1974 | Tanikoshi et al. | 352/141 X |
| 4,093,365 | 6/1978 | Isono | 354/25 P |
| 4,318,598 | 3/1982 | Fukuhara et al. | 354/25 X |

*Primary Examiner*—William B. Perkey
*Attorney, Agent, or Firm*—Toren, McGeady and Stanger

[57] ABSTRACT

In a still-picture camera using a servo-like automatic focusing device, the automatic focusing device is locked and inhibited from operating when a shutter release is performed. The invented arrangement permits the use of a servo-like automatic focusing device for a still-picture camera without impairing operability. Furthermore, the invention permits selection of a servo-like automatic focusing function or a one-shot focusing function which is effected during a sequence of steps on a member such as a release operation member, so that the automatic focusing functions can be selected by utilizing the operability of the still-picture camera without impairing the operability thereof.

9 Claims, 5 Drawing Figures

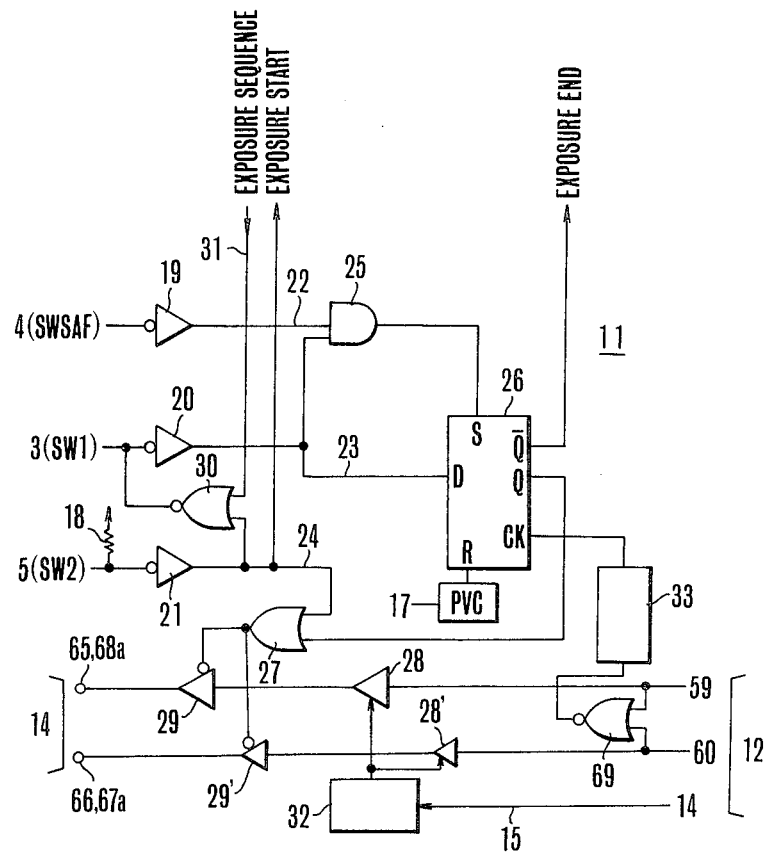

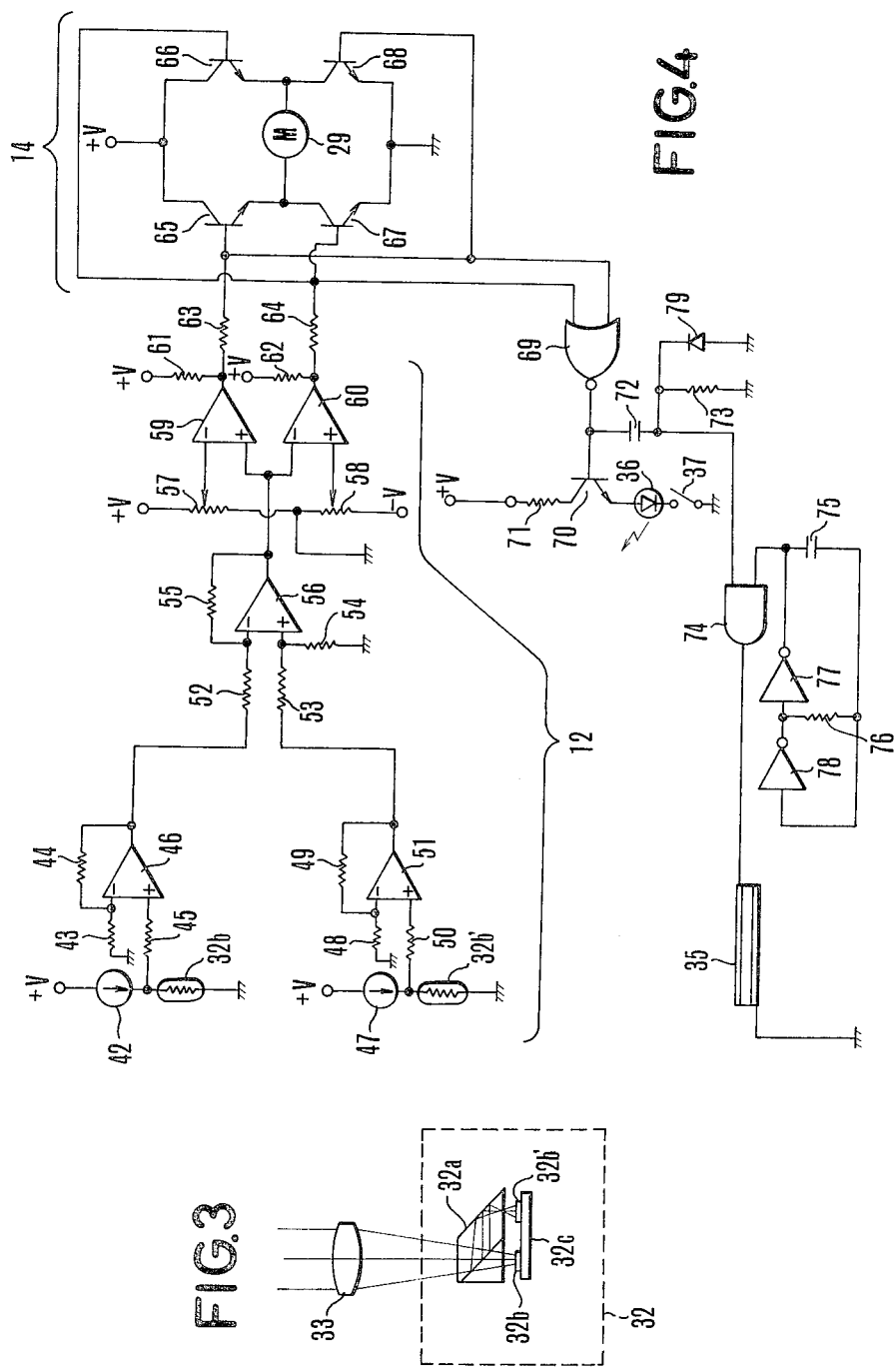

CAMERA WITH AUTOMATIC FOCUSING DEVICE

BACKGROUND OF THE INVENTION

1. Field of the Invention

This invention relates to a photographic camera and more particularly to a sequence control relative to the operability of an automatic focusing device in a single-lens reflex camera.

2. Description of the Prior Art

Conventionally known automatic focusing devices of this class include a servo-like automatic focusing device and a one-shot automatic focusing device. Hereinafter the term "automatic focusing" will be called AF for short. The servo-like AF device continuously performs distance adjustment by following a moving object to be photographed and, accordingly, has been used for a motion-picture camera which is adapted for photographing the motion of the object. The one-shot AF device on the other hand performs distance adjustment for each individual shot and, therefore, has been used for a still-picture camera.

However, there are some occasions that call on a still-picture camera for the use of a servo-like AF device.

SUMMARY OF THE INVENTION

It is therefore an object of the invention to enable a still-picture camera to use a servo-like AF device without impairing the operability of the camera. To attain this objective, the servo-like AF device is rendered operative before the camera performs a release action and is inhibited from operating when a first stroke or a second stroke on the release button is performed on the camera which starts a light measuring action or an exposure effecting action. The apparatus in accordance with the invention thus utilizes and preserves the operability of a still camera by allowing the servo-like AF device to carry out a distance adjustment action before exposure begins.

It is another object of the invention to provide a camera wherein, distance adjustment is carried out by a one-shot AF function in response to a release operation when a release operation member is operated before a first operation member is operated to cause a servo-like AF function to be performed; automatic focusing action is carried out by the servo-like AF function in response to an operation on the first operation member when the first operation member is operated before the release operation member is operated; and, thereafter, the servo-like AF function is rendered inoperative by the release operation. The camera according to the invention permits change-over between a servo-like AF function and a one-shot AF function by utilizing the operation arrangement of the conventional camera and enhances the operability thereof.

These and further objects and features of the invention will become apparent from the following detailed description of the embodiments thereof and the accompanying drawings.

BRIEF DESCRIPTION OF THE DRAWINGS

FIG. 2 is a circuit diagram showing a control circuit, shown in FIG. 1, as an embodiment of the invention.

FIG. 4 shows a focus detection circuit 12 and a control circuit 14, shown in FIG. 1.

FIG. 3 shows the optical arrangement of the light sensitive elements included in the focus detection circuit 12.

FIG. 5 is a block diagram showing an exposure control circuit of a camera in an embodiment of the invention.

DETAILED DESCRIPTION OF THE PREFERRED EMBODIMENTS

Figure 1:
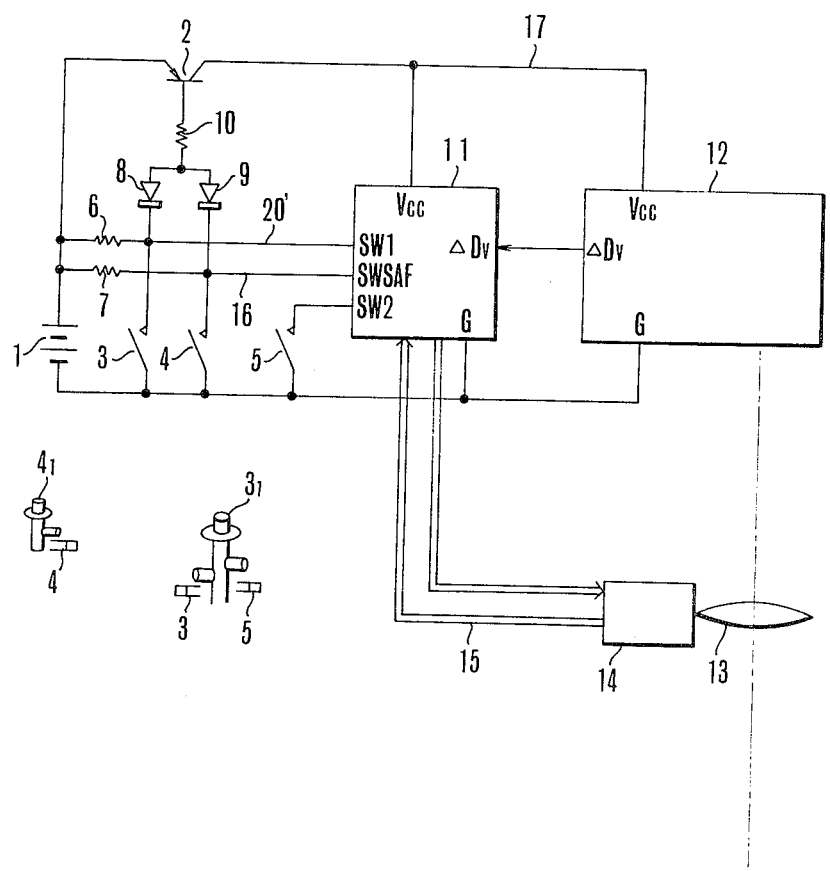
FIG. 1 is a block diagram showing the outline of an AF circuit in an embodiment of the invention.

Referring to FIGS. 1 and 2 which show an embodiment of the invention, the embodiment is provided with a power source 1 which is a battery; a PNP transistor 2 which is connected to the battery 1 and which controls a power supply to the load; a light measurement start switch 3 (or SW-1) which turns on in response to the first stroke of a camera release operation member 31; a switch 4 (or SW-S-AF) which turns on in response to the movement of an operation member 41; an exposure start switch 5 (or SW-2) which turns on in response to the second stroke of the release operation member 31; pull-up resistors 6 and 7 which are provided for the switches 3 and 4; diodes 8 and 9 which operate the transistor 2 through a current control resistor 10 as the switches 3 and 4 turn on and off; a control circuit 11 embodying the present invention; a focus detection circuit 12; a lens 13 which is subjected to focus adjustment; and a control circuit 14 for operation of the lens 13. The control circuit 14 includes a motor 129.

The focus detection circuit 12 and the control circuit 14 are described in the specification of a Japanese Laid-open Patent Application No. 55-155337. FIGS. 3 and 4 are illustrations of the focus detection circuit 12 and the control circuit 14 shown in the above Japanese patent application together with the optical arrangement of the focus detection circuit 12. Since these circuits 12, 14 are known, details of them are omitted herein. Briefly stated with reference to FIGS. 3 and 4, however, there are provided light sensitive elements 32b and 32b' which are arranged in the direction of an optical axis an have equal optical path differences across an anticipated focal plane. The object to be photographed is imaged on these light sensitive elements 32b and 32b'. The focusing status is detected from the outputs of these light sensitive elements 32b and 32b'. If a near-focus status is detected, a comparator 60 produces a high output level. In the case of a far-focus status, another comparator 59 produces a high level output. The motor 129 is then rotated in a normal or reverse direction according to the output to carry out distance adjustment by driving the lens 13 with the motor 129. When an in-focus status is obtained through this adjustment, the comparators 59 and 60 both produce low level outputs causing the motor 129 to stop and thus complete the distance adjustment by ending the lens driving action thereof.

In arranging the focus detection circuit 12 and the control circuit 14 of FIG. 4 in the embodiment of the invention shown in FIGS. 1 and 2, amplifiers 28 and 29 which are shown in FIG. 2 and will be further described later herein are connected between the output terminal of the comparator 59 and the bases of transistors 65 and 68. Furthermore, the amplifiers 28' and 29' are connected between the output terminal of the comparator 60 and the bases of transistors 67 and 66. The output of the focus detection circuit 12 shown in FIG. 4, is transmitted to the control circuit 14 in this manner.

Referring now to FIG. 2 which shows by way of example the control circuit 11 shown in FIG. 1, the operation of the arrangement is as follows: When the switch 4 (SW-S-AF) is turned on by operating the operation member 41, the level of line 16 becomes low irrespective of the pull-up resistor 7. Then, a base current of the transistor 2 is produced through the diode 9 and the resistor 10 turning on the transistor 2. With the transistor 2 thus turned on, a power supply to a line 17 is effected to actuate the focus detection circuit 12 and the control circuit 14. The focus detection circuit 12 detects the focus adjustment status of the lens 13 and produces a signal representing near-focus, in-focus or far-focus status. At this time, since the switch 3 (SW-1) is off, the level of the switch 3 is rendered high by the resistor 6 while the level of the signal of the switch 5 (SW-2) is also rendered high by a pull-up resistor 18, shown in FIG. 2, because the switch 5 is also off at that time. Therefore, lines 22, 23 and 24 produce respectively a high signal, a low signal and a low signal by invert gates 19, 20 and 21. Since the level of the line 23 is low, an AND gate 25 produces a low level signal therefrom. At the time when the power source is turned on, a direct set D-type flip-flop 26 is reset, that is, the flip-flop 26 is reset by a power up clear circuit PVC which produces power up clear pulses when a power supply is effected to the line 17. Therefore, the flip-flop 26 remains reset because the output of the AND gate 25, which is to be supplied to the flip-flop 26 as a set input thereto, is at a low level. Accordingly, the $\overline{Q}$ output of the flip-flop 26 remains at a high level and the Q output thereof at a low level. With the level of the Q output of the flip-flop 26 remaining low, the output level of a motor drive inhibiting OR gate 27 remains low. The focus detection signal from the focus detection circuit 12 is then transmitted to the lens control circuit 14 through amplifiers 28 and 28' and amplifiers 29 and 29', which will be described later herein. With the signal thus transmitted to the lens control circuit 14, automatic focusing (AF) is carried out in a servo-mechanism like manner. More specifically, since the output of the OR gate 27 is at a low level, the amplifier 29 is operative. The output of the focus detection circuit 12 is transmitted to the control circuit 14. The motor 29 rotates in the normal or reverse direction according to the output of the detection circuit 12 carrying out a distance adjustment action until an in-focus condition is attained. Furthermore, when the object to be photographed moves, the movement of the object is immediately detected and the distance adjustment action is continuously carried out by following the movement of the object.

Under the above condition, when the switch 3 (SW-1) is turned on by the first stroke on the release button 31 when the release button 31 is operated by the operator of the camera, the level of a line 20' becomes low. This causes the level of the line 23 to become high through the invert gate 20. Then, a transistor 100, shown in FIG. 5, turns on allowing a power supply to reach a circuit 102 of a light measuring system. The light measuring system circuit 102 operates in a known manner. Meanwhile, the line 22 level becomes high rendering the output level of the AND gate 25 high. The high output level of the AND gate 25 then directly sets the flip-flop 26. As a result, $\overline{Q}$ output level of the flip-flop 26 becomes low removing the exposure inhibition which has been effected during the AF driving action. The Q output level of the flip-flop 26 becomes high to render the level of the output of the OR gate 27 high. This inhibits the amplifiers 29 and 29' from producing outputs (or renders the levels of their outputs low). The control circuit 14 then becomes inoperative bringing the AF action to a stop. In short, the AF arrangement is locked by the first stroke on the release button 31. After the first stroke on the release button 31, the second stroke thereof causes the switch 5 (SW-2) to turn on. As a result, an exposure start signal, i.e. a high level signal, is produced at the line 24 through the invert gate 21. Then, the level output level of an AND gate 109, which is shown in FIG. 5, becomes high turning on a transistor 108. An electric charge of a capacitor 106 then flows to a magnet 107 which is provided for shutter release. A shutter release action takes place causing leading shutter curtain travel initiating an exposure. Meanwhile, a shutter time control circuit 104 performs a shutter time control action based on the output of the light measuring circuit 102. After the lapse of a shutter time, the power supply to a magnet 105 is inhibited allowing travel of the trailing shutter curtain and exposure ends. The second stroke on the release button 31 sets a flip-flop 110. The flip-flop 110 is set until a switch 111 operates in response to the travel of the trailing shutter curtain. Therefore, a NOR gate 30 continues to produce a low level signal throughout the period of exposure to sustain a power supply to the shutter control circuit shown in FIG. 5 during exposure even if the switch 3 then turns off.

When the operator of the camera does not wish to have the servo-like AF action performed, the first operation of the release button 31 turns on the switch 3 (SW-1), as in the case of the conventional camera, while the switch 4 is off, that is, without operating the operation member 41 which is interlocked with the switch 4. Then, the level of the signal level of the switch 3 (SW-1) becomes low while the signal level of the switch 4 (SW-S-AF) remains high. As a result, the levels of the lines 22, 23 and 24 respectively become low, high and low. Therefore, the output level of the AND gate 25 is low leaving the flip-flop 26 in a reset state. When the signal from the focus detection circuit 12 comes to an end, i.e. where an in-focus condition is obtained through AF, or after the lapse of a predetermined time, pulses produced from a pulse generation circuit 33 which is composed of a mono-multi circuit supplies the flip-flop 26 with clock pulses. This causes the flip-flop 26 to receive a high level signal of the switch 3 (SW-1) from the line 23 via a terminal D thereof. The flip-flop 26 is set by this high level signal as mentioned in the foregoing. With the flip-flop 26 set, the AF action stops as mentioned in the foregoing and one-shot AF (or a noncontinuous AF action) is accomplished. In other words:

Since the transistor 2 has been turned on through the switch 3 and since the focus detection circuit 12 is rendered operative by the first stroke on the release button 31, the first stroke causes the output of the focus detection circuit 12 to be transmitted to the control circuit 14 for distance adjustment action, as described in the foregoing. With the distance adjustment action by the focus detection circuit 12 and the control circuit 14, the lens is driven to an in-focus position. With an in-focus condition thus attained, the comparators 59 and 60, which are shown in FIG. 4, produce low level outputs respectively as described in the foregoing. This causes the NOR gate 69 to produce a high level signal. The pulse generation circuit 33 is rendered operative by the high level signal setting the flip-flop 26. The Q output of the flip-flop 26 then becomes high to inhibit the amplifiers 29 and 29' from operating. Under this condition, the distance adjustment action is inhibited from being performed. Therefore, when the release operation is performed by the first stroke thereof before the switch 4 is turned on, distance adjusting action is performed to carry out a one-shot AF. After that, the second stroke of the release operation turns on the switch 5 beginning exposure control action, as described in the foregoing.

In this embodiment, the switches 3 and 4 are discrete parts. However, depending on the method employed for power supply control, the switches 3 and 4 may be designed as one part.

Furthermore, a smooth lens driving action can be ensured by the following arrangement: When the lens is driven, load information such as information on driving torque required for driving the lens 13 is obtained from the line 15. Then, a gain controller 32 performs gain control on the basis of the load information to adjust the gains of the amplifiers 28 and 28' according to the lens driving load. This enables power adjustment required for driving the lens 13 according to the load.

In accordance with the invention, a camera performs either a distance adjustment action by a servo-like AF function or a change-over between the servo-like AF function and a one-shot AF function by utilizing the operability of the conventional still-picture camera without impairing the operability.

What we claim:

1. A camera comprising:
   (a) an automatic focusing device capable of performing a servo-like automatic focusing function by continuously carrying out distance adjustment following the movement of an object to be photographed;
   (b) a release operation member;
   (c) a switch arranged to shift from a first condition to a second condition in response to an operation on said release operation member;
   (d) a photo-taking circuit arranged to operate when said switch shifts to the second condition; and
   (e) a control circuit arranged to inhibit said automatic focusing device from operating when said switch shifts to the second condition thereof.

2. A camera comprising:
   (a) an automatic focusing device capable of performing a servo-like automatic focusing function by continuously carrying out distance adjustment following the movement of an object to be photographed;
   (b) a release operation member;
   (c) a switch arranged to shift from a first condition to a second condition in response to an operation on said release operation member;
   (d) an exposure control circuit of the camera;
   (e) power supply switching means which performs a switching action to form a power supply path to said exposure control circuit in response to shifting of said switch to the second condition thereof; and
   (f) a control circuit arranged to lock said automatic focusing device to inhibit the operation of the device when said switch shifts to the second condition.

3. A camera according to claim 1 or 2, wherein said automatic focusing device includes a focus detection circuit which detects a distance to an object to be photographed or a focusing status and a driving circuit which drives a lens system in accordance with the output of said focus detection circuit, said driving circuit being arranged to be inhibited from operating when said switch shifts to the second condition thereof.

4. A camera according to claim 1 or 2, further including a first operation member for actuating said automatic focusing device.

5. A camera comprising:
   (a) an automatic focusing device capable of performing a servo-like automatic focusing function by continuously carrying out distance adjustment following the movement of an object to be photographed;
   (b) a release operation member;
   (c) an exposure control circuit which becomes operative when said release operation member is operated; and
   (d) a control circuit arranged to inhibit the operation of said automatic focusing device in response to an operation on said release operation member;
   and wherein said camera is provided with a first operation member for actuating said automatic focusing device; said exposure control circuit is arranged to be brought into a light measuring state by the first stroke of an operation on said release operation member and to be caused to initiate an exposure action by the second stroke thereof; and said control circuit is arranged to lock said automatic focusing device in response to the first stroke of said operation.

6. A camera comprising:
   (a) an automatic focusing device capable of performing both a servo-like automatic focusing function by continuously carrying out distance adjustment following the movement of an object to be photographed and a one-shot automatic focusing function by carrying out distance adjustment just for once;
   (b) a first operation member;
   (c) a release operation member;
   (d) an exposure control circuit arranged to operate in response to an operation on said release operation member; and
   (e) a control circuit including a detection circuit which detects the operating states of said first operation member and said release operation member, said control circuit being arranged to operate in a first mode when the operating state of the first operation member is detected and to operate in a second mode when the operating state of the release operation member is detected before detection of the operating state of the first operation member, the first mode of said control circuit being arranged to select the servo-like automatic focusing function of said automatic focusing device to have the automatic focusing device perform the servo-like automatic focusing function until the operating state of said release operation member is detected, the second mode being arranged to select the one-shot automatic focusing function of the automatic focusing device to have the automatic focusing device perform the one-shot automatic focusing function.

7. A camera according to claim 6, wherein said exposure control circuit is arranged to be brought into a light measuring state by the first stroke of an operation on said release operation member and to be caused to initiate an exposure action by the second stroke thereof; the first mode of said control circuit is arranged to keep said automatic focusing device in an operative state until the first stroke of said operation is detected; and said second mode of said control circuit is arranged to cause the automatic focusing device to perform said one-shot automatic focusing function when the first stroke of said operation is detected.

8. A camera system for performing light metering and exposure control by actuation of a release operation member, comprising:
   (a) an automatic focusing device capable of performing both a servo-like automatic focusing function by continuously carrying out distance adjustment following the movement of an object to be photographed and a one-shot automatic focusing function by carrying out distance adjustment just for once;
   (b) a select member for selecting a one-shot or a servo-like automatic focusing function; and
   (c) a control circuit responsive to selection of the one-shot automatic focusing function by said select member for carrying out a focusing adjustment by the one-shot automatic focusing function before an exposure control is carried out by said release operation member in response to said member and responsive to selection of the servo-like automatic focusing function for carrying out a focusing adjustment by the servo-like automatic focusing function and prohibiting an automatic focusing device from being actuated before an exposure control is carried out by said release operation member.

9. A camera system according to claim 8, in which said one-shot automatic focusing function starts to operate when a light metering operation is initiated by actuation of said release operation member.

* * * * *